US012732315B2

(12) United States Patent
Li et al.

(10) Patent No.: US 12,732,315 B2
(45) Date of Patent: Sep. 8, 2026

(54) DIGITAL BEAMFORMING BASED ON UNIQUE PRE-DISCRETE FOURIER TRANSFORM SPREADING SEQUENCES

(71) Applicant: QUALCOMM Incorporated, San Diego, CA (US)

(72) Inventors: Qiaoyu Li, Beijing (CN); Chao Wei, Beijing (CN); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 294 days.

(21) Appl. No.: 18/567,218

(22) PCT Filed: Aug. 4, 2021

(86) PCT No.: PCT/CN2021/110447
§ 371 (c)(1),
(2) Date: Dec. 5, 2023

(87) PCT Pub. No.: WO2023/010310
PCT Pub. Date: Feb. 9, 2023

(65) Prior Publication Data

US 2024/0267172 A1 Aug. 8, 2024

(51) Int. Cl.
*H04L 5/00* (2006.01)
*H04B 7/06* (2006.01)

(52) U.S. Cl.
CPC ....... *H04L 5/0023* (2013.01); *H04B 7/06952* (2023.05); *H04L 5/0051* (2013.01)

(58) Field of Classification Search
CPC ... H04L 5/0023; H04L 5/0051; H04L 5/0007; H04L 5/001; H04L 5/0025; H04L 27/2605; H04L 27/26134; H04L 27/2634; H04L 5/0094; H04L 27/2636; H04L 27/2657; H04B 7/06952; H04B 7/088; H04B 7/01;

(Continued)

(56) References Cited

U.S. PATENT DOCUMENTS 10,958,395 B2 * 3/2021 Kuchi .................. H04L 5/0051
2005/0036575 A1 * 2/2005 Kuchi ............... H04L 25/03178
375/348

(Continued)

OTHER PUBLICATIONS

International Search Report and Written Opinion—PCT/CN2021/110447—ISA/EPO—Feb. 9, 2022.

(Continued)

*Primary Examiner* — Luat Phung
(74) *Attorney, Agent, or Firm* — Harrity & Harrity, LLP

(57) ABSTRACT

Various aspects of the present disclosure generally relate to wireless communication. In some aspects, a user equipment (UE) may receive, from a wireless communication device, an aggregated signal including a plurality of frequency division multiplexed (FDM) signals corresponding to a plurality of beams, each of the plurality of signals comprising a discrete Fourier transform (DFT)—spread-orthogonal frequency division multiplexing (DFT-s-OFDM) waveform associated with a unique pre-DFT-spreading sequence of a plurality of pre-DFT-spreading sequences. The UE may decode the plurality of FDM signals based at least in part on the plurality of pre-DFT-spreading sequences. Numerous other aspects are described.

25 Claims, 8 Drawing Sheets

(58) Field of Classification Search
CPC .. H04W 72/231; H04W 72/232; H04W 84/06
See application file for complete search history.

(56) References Cited

U.S. PATENT DOCUMENTS

| | | | | |
|---|---|---|---|---|
| 2007/0217490 | A1* | 9/2007 | Blake | H04L 27/2626 375/222 |
| 2018/0206132 | A1* | 7/2018 | Guo | H04W 16/28 |
| 2018/0316537 | A1 | 11/2018 | Haghighat et al. | |
| 2019/0158331 | A1* | 5/2019 | Pawar | H04L 27/2605 |
| 2020/0059398 | A1 | 2/2020 | Pan et al. | |
| 2022/0095228 | A1* | 3/2022 | Sahin | H04W 52/0216 |

OTHER PUBLICATIONS

Lin X., et al., "5G New Radio Evolution Meets Satellite Communications: Opportunities, Challenges, and Solutions", arxiv.org, Cornell University Library, 201 Olin Library Cornell University Ithaca, NY14853, Mar. 27, 2019 (Mar. 27, 2019), XP081158513, pp. 1-8, Sections V-B and VI.

* cited by examiner

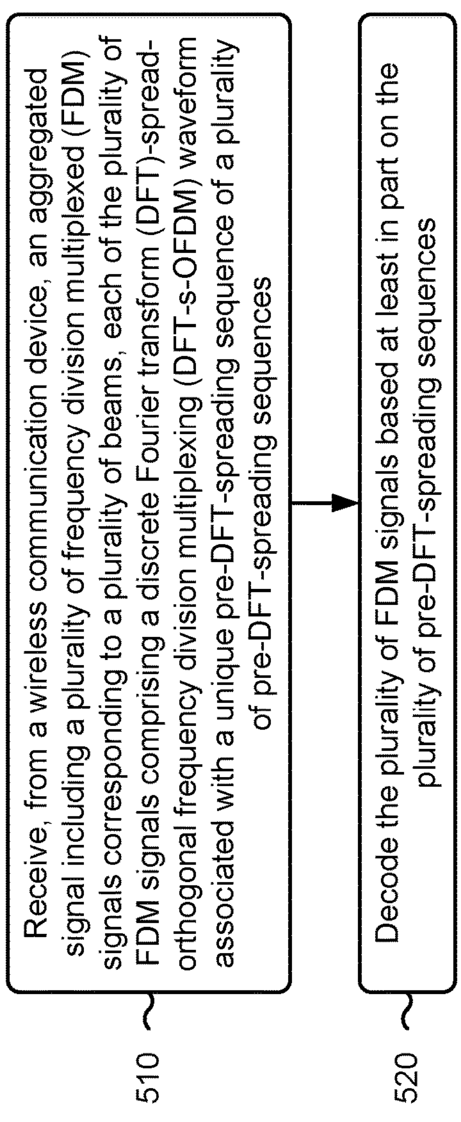
500
510
Receive, from a wireless communication device, an aggregated signal including a plurality of frequency division multiplexed (FDM) signals corresponding to a plurality of beams, each of the plurality of FDM signals comprising a discrete Fourier transform (DFT)-spread-orthogonal frequency division multiplexing (DFT-s-OFDM) waveform associated with a unique pre-DFT-spreading sequence of a plurality of pre-DFT-spreading sequences
520
Decode the plurality of FDM signals based at least in part on the plurality of pre-DFT-spreading sequences

FIG. 5

600

DIGITAL BEAMFORMING BASED ON UNIQUE PRE-DISCRETE FOURIER TRANSFORM SPREADING SEQUENCES

CROSS-REFERENCE TO RELATED APPLICATION

This Patent Application is a 371 national stage of PCT Application No. PCT/CN2021/110447 filed on Aug. 4, 2021, entitled "DIGITAL BEAMFORMING BASED ON UNIQUE PRE-DISCRETE FOURIER TRANSFORM SPREADING SEQUENCES," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for digital beamforming based on unique pre-discrete-Fourier-transform-spreading sequences.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to an apparatus for wireless communication at a user equipment (UE). The apparatus may include a memory. The apparatus may include one or more processors, coupled to the memory, configured, receive, from a wireless communication device, an aggregated signal including a plurality of frequency division multiplexed signals corresponding to a plurality of beams, each of the plurality of signals comprising a discrete Fourier transform (DFT)-spread-orthogonal frequency division multiplexing (DFT-s-OFDM) waveform associated with a unique pre-DFT-spreading sequence of a plurality of pre-DFT-spreading sequences decode the plurality of signals based at least in part on the plurality of pre-DFT-spreading sequences.

Some aspects described herein relate to an apparatus for wireless communication at a wireless communication device. The apparatus may include a memory. The apparatus may include one or more processors, coupled to the memory, configured, generate an aggregated signal including a plurality of frequency division multiplexed signals corresponding to a plurality of beams, each of the plurality of signals comprising a DFT-s-OFDM waveform associated with a unique pre-DFT-spreading sequence of a plurality of pre-DFT-spreading sequences transmit the plurality of signals.

Some aspects described herein relate to a method of wireless communication performed by a UE. The method may include receiving, from a wireless communication device, an aggregated signal including a plurality of frequency division multiplexed signals corresponding to a plurality of beams, each of the plurality of signals comprising a DFT-s-OFDM waveform associated with a unique pre-DFT-spreading sequence of a plurality of pre-DFT-spreading sequences. The method may include decoding the plurality of signals based at least in part on the plurality of pre-DFT-spreading sequences.

Some aspects described herein relate to a method of wireless communication performed by a wireless communication device. The method may include generating an aggregated signal including a plurality of frequency division multiplexed signals corresponding to a plurality of beams, each of the plurality of signals comprising a DFT-s-OFDM waveform associated with a unique pre-DFT-spreading sequence of a plurality of pre-DFT-spreading sequences. The method may include transmitting the plurality of signals.

Some aspects described herein relate to a UE for wireless communication. The user equipment may include a memory and one or more processors coupled to the memory. The one or more processors may be configured to receive, from a wireless communication device, an aggregated signal including a plurality of frequency division multiplexed signals corresponding to a plurality of beams, each of the plurality of signals comprising a DFT-s-OFDM waveform associated with a unique pre-DFT-spreading sequence of a plurality of pre-DFT-spreading sequences. The one or more processors may be configured to decode the plurality of signals based at least in part on the plurality of pre-DFT-spreading sequences.

Some aspects described herein relate to a wireless communication device for wireless communication. The wireless communication device may include a memory and one or more processors coupled to the memory. The one or more processors may be configured to generate an aggregated signal including a plurality of frequency division multiplexed signals corresponding to a plurality of beams, each of the plurality of signals comprising a DFT-s-OFDM waveform associated with a unique pre-DFT-spreading sequence of a plurality of pre-DFT-spreading sequences. The one or more processors may be configured to transmit the plurality of signals.

Some aspects described herein relate to a non-transitory computer-readable medium that stores a set of instructions for wireless communication by a UE. The set of instructions, when executed by one or more processors of the UE, may cause the UE to receive, from a wireless communication device, an aggregated signal including a plurality of frequency division multiplexed signals corresponding to a plurality of beams, each of the plurality of signals comprising a DFT-s-OFDM waveform associated with a unique pre-DFT-spreading sequence of a plurality of pre-DFT-spreading sequences. The set of instructions, when executed by one or more processors of the UE, may cause the UE to decode the plurality of signals based at least in part on the plurality of pre-DFT-spreading sequences.

Some aspects described herein relate to a non-transitory computer-readable medium that stores a set of instructions for wireless communication by a wireless communication device. The set of instructions, when executed by one or more processors of the wireless communication device, may cause the wireless communication device to generate an aggregated signal including a plurality of frequency division multiplexed signals corresponding to a plurality of beams, each of the plurality of signals comprising a DFT-s-OFDM waveform associated with a unique pre-DFT-spreading sequence of a plurality of pre-DFT-spreading sequences. The set of instructions, when executed by one or more processors of the wireless communication device, may cause the wireless communication device to transmit the plurality of signals.

Some aspects described herein relate to an apparatus for wireless communication. The apparatus may include means for receiving, from a wireless communication device, an aggregated signal including a plurality of frequency division multiplexed signals corresponding to a plurality of beams, each of the plurality of signals comprising a DFT-s-OFDM waveform associated with a unique pre-DFT-spreading sequence of a plurality of pre-DFT-spreading sequences. The apparatus may include means for decoding the plurality of signals based at least in part on the plurality of pre-DFT-spreading sequences.

Some aspects described herein relate to an apparatus for wireless communication. The apparatus may include means for generating an aggregated signal including a plurality of frequency division multiplexed signals corresponding to a plurality of beams, each of the plurality of signals comprising a DFT-s-OFDM waveform associated with a unique pre-DFT-spreading sequence of a plurality of pre-DFT-spreading sequences. The apparatus may include means for transmitting the plurality of signals.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 5 and 6 are diagrams illustrating example processes associated with digital beamforming based on unique pre-DFT-spreading sequences, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
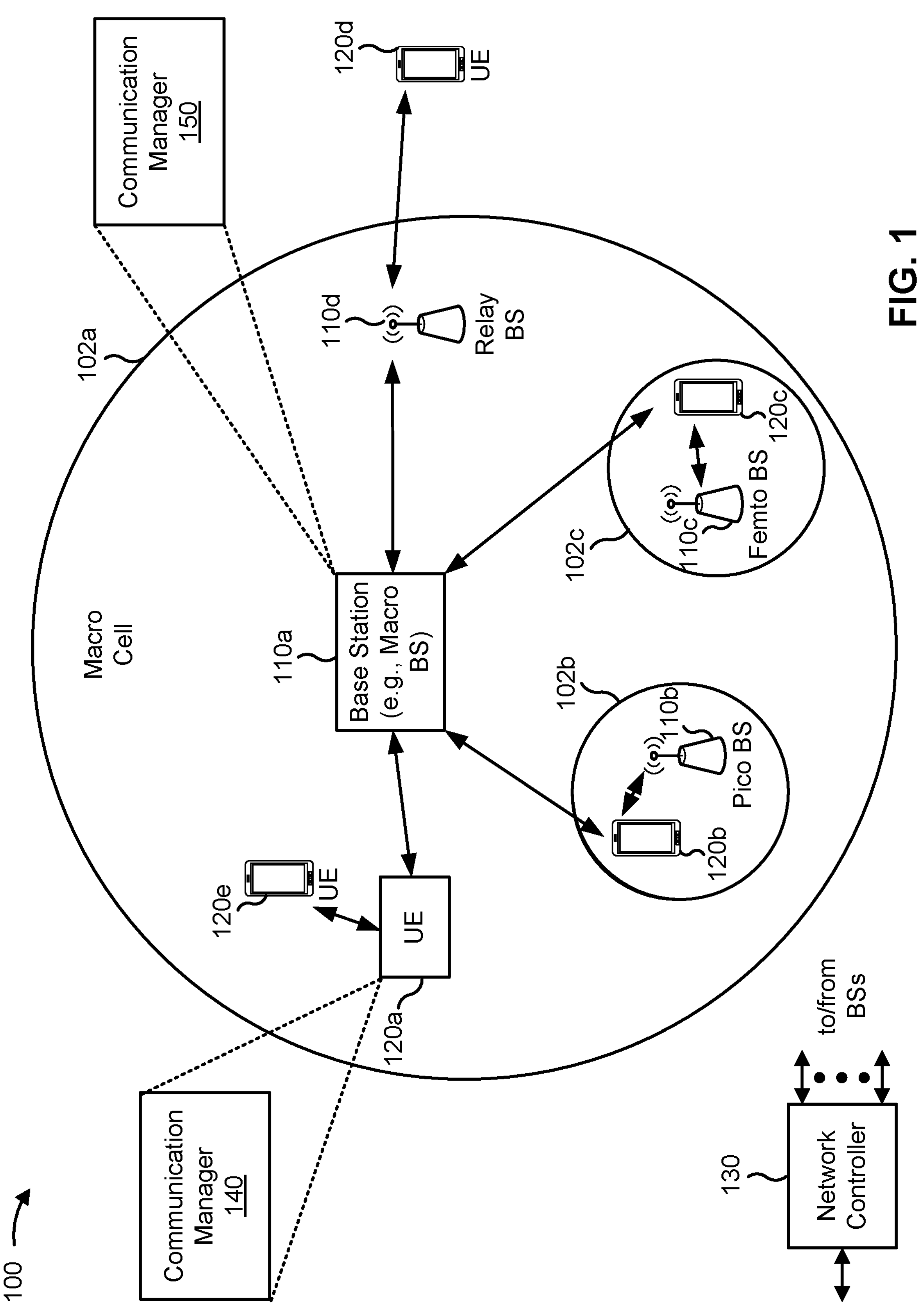
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

In some aspects, the wireless network 100 may include one or more non-terrestrial network (NTN) deployments in which a non-terrestrial wireless communication device may include a UE (referred to herein, interchangeably, as a "non-terrestrial UE"), a BS (referred to herein, interchangeably, as a "non-terrestrial BS" and "non-terrestrial base station"), a relay station (referred to herein, interchangeably, as a "non-terrestrial relay station"), and/or the like. As used herein, an NTN may refer to a network for which access is facilitated by a non-terrestrial UE, non-terrestrial BS, a non-terrestrial relay station, and/or the like.

The wireless network 100 may include any number of non-terrestrial wireless communication devices. A non-terrestrial wireless communication device may include a satellite, a manned aircraft system, an unmanned aircraft system (UAS) platform, and/or the like. A satellite may include a low-earth orbit (LEO) satellite, a medium-earth orbit (MEO) satellite, a geostationary earth orbit (GEO) satellite, a high elliptical orbit (HEO) satellite, and/or the like. A manned aircraft system may include an airplane, helicopter, a dirigible, and/or the like. A UAS platform may include a high-altitude platform station (HAPS), and may include a balloon, a dirigible, an airplane, and/or the like. A non-terrestrial wireless communication device may be part of an NTN that is separate from the wireless network 100. Alternatively, an NTN may be part of the wireless network 100. Satellites may communicate directly and/or indirectly with other entities in wireless network 100 using satellite communication. The other entities may include UEs (e.g., terrestrial UEs and/or non-terrestrial UEs), other satellites in the one or more NTN deployments, other types of BSs (e.g., stationary and/or ground-based BSs), relay stations, one or more components and/or devices included in a core network of wireless network 100, and/or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive, from a wireless communication device, an aggregated signal including a plurality of frequency division multiplexed signals corresponding to a plurality of beams, each of the plurality of signals comprising a discrete Fourier transform (DFT)-spread-orthogonal frequency division multiplexing (DFT-s-OFDM) waveform associated with a unique pre-DFT-spreading sequence of a plurality of pre-DFT-spreading sequences; and decode the plurality of signals based at least in part on the plurality of pre-DFT-spreading sequences. Additionally, or alternatively, the communication manager 140 may perform one or more other operations described herein.

In some aspects, the wireless communication device may include a communication manager 140 or 150. As described in more detail elsewhere herein, the communication manager 140 or 150 may generate an aggregated signal including a plurality of frequency division multiplexed signals corresponding to a plurality of beams, each of the plurality of signals comprising a DFT-s-OFDM waveform associated with a unique pre-DFT-spreading sequence of a plurality of pre-DFT-spreading sequences; and transmit the plurality of signals. Additionally, or alternatively, the communication manager 140 or 150 may perform one or more other operations described herein.

As indicated above, FIG. 1 is provided as an example. Other examples may differ from what is described with regard to FIG. 1.

Figure 2:
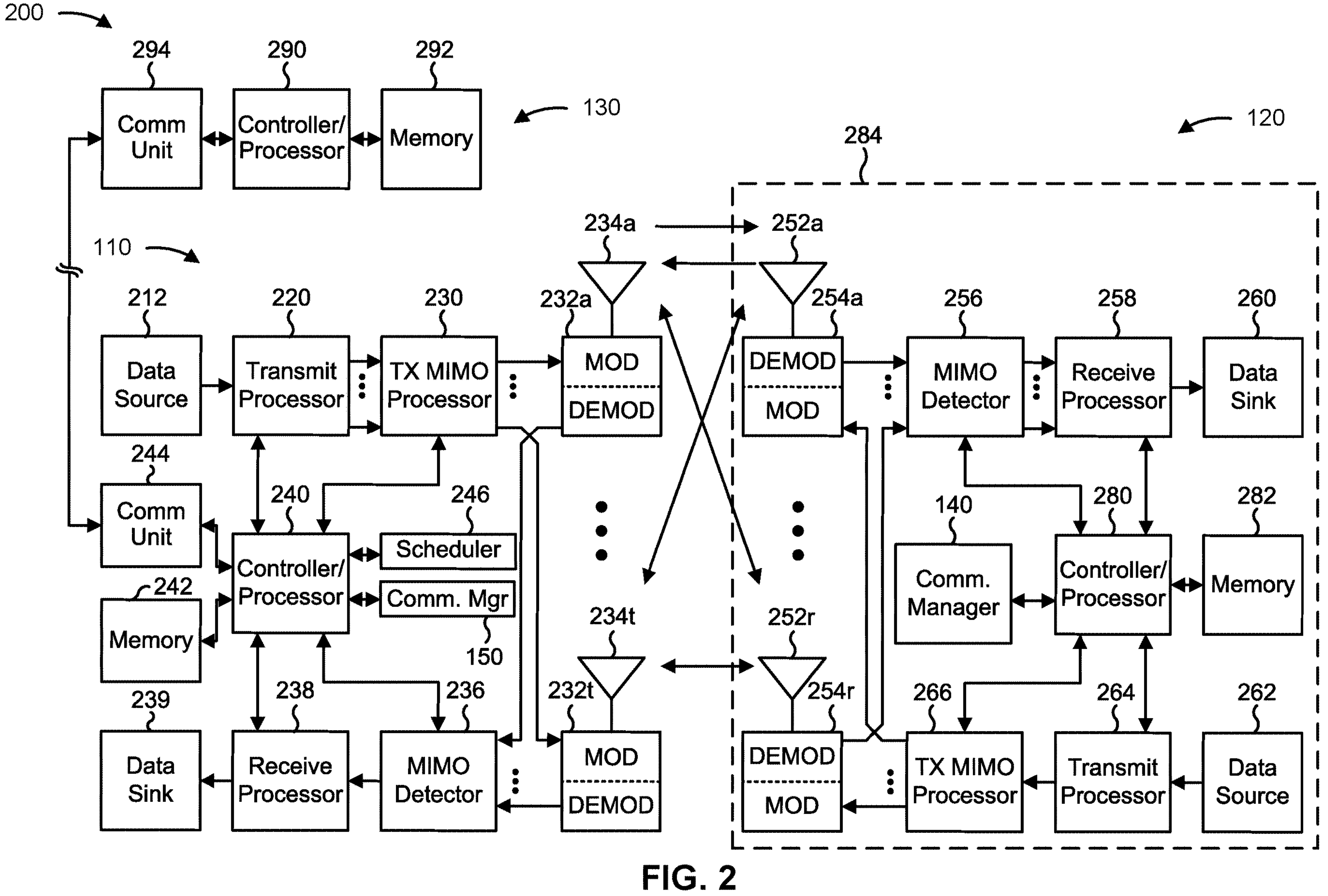
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234*a* through 234*t*, such as T antennas (T≥1). The UE 120 may be equipped with a set of antennas 252*a* through 252*r*, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The UE 120 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the base station 110 and/or other base stations 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

Each of the antenna elements may include one or more sub-elements for radiating or receiving RF signals. For example, a single antenna element may include a first sub-element cross-polarized with a second sub-element that can be used to independently transmit cross-polarized signals. The antenna elements may include patch antennas, dipole antennas, or other types of antennas arranged in a linear pattern, a two dimensional pattern, or another pattern. A spacing between antenna elements may be such that signals with a desired wavelength transmitted separately by the antenna elements may interact or interfere (e.g., to form a desired beam). For example, given an expected range of wavelengths or frequencies, the spacing may provide a quarter wavelength, half wavelength, or other fraction of a wavelength of spacing between neighboring antenna elements to allow for interaction or interference of signals transmitted by the separate antenna elements within that expected range.

Antenna elements and/or sub-elements may be used to generate beams. "Beam" may refer to a directional transmission such as a wireless signal that is transmitted in a direction of a receiving device. A beam may include a directional signal, a direction associated with a signal, a set of directional resources associated with a signal (e.g., angle of arrival, horizontal direction, vertical direction), and/or a set of parameters that indicate one or more aspects of a directional signal, a direction associated with a signal, and/or a set of directional resources associated with a signal.

As indicated above, antenna elements and/or sub-elements may be used to generate beams. For example, antenna elements may be individually selected or deselected for transmission of a signal (or signals) by controlling an amplitude of one or more corresponding amplifiers. Beamforming includes generation of a beam using multiple signals on different antenna elements, where one or more, or all, of the multiple signals are shifted in phase relative to each other. The formed beam may carry physical or higher layer reference signals or information. As each signal of the multiple signals is radiated from a respective antenna element, the radiated signals interact, interfere (constructive and destructive interference), and amplify each other to form a resulting beam. The shape (such as the amplitude, width, and/or presence of side lobes) and the direction (such as an angle of the beam relative to a surface of an antenna array) can be dynamically controlled by modifying the phase shifts or phase offsets of the multiple signals relative to each other.

Beamforming may be used for communications between a UE and a base station, such as for millimeter wave communications and/or the like. In such a case, the base station may provide the UE with a configuration of transmission configuration indicator (TCI) states that respectively indicate beams that may be used by the UE, such as for receiving a physical downlink shared channel (PDSCH). The base station may indicate an activated TCI state to the UE, which the UE may use to select a beam for receiving the PDSCH.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-6).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem (s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-6).

The controller/processor 240 of the base station 110, the controller/processor 280 of the UE 120, and/or any other component(s) of FIG. 2 may perform one or more techniques associated with digital beamforming based on unique pre-discrete-Fourier-transform-spreading (pre-DFT-spreading) sequences, as described in more detail elsewhere herein. In some aspects, the wireless communication device described herein is the base station 110, is included in the base station 110, or includes one or more components of the base station 110 shown in FIG. 2. For example, the controller/processor 240 of the base station 110, the controller/processor 280 of the UE 120, and/or any other component(s) of FIG. 2 may perform or direct operations of, for example, process 500 of FIG. 5, process 600 of FIG. 6, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, process 600 of FIG. 6, and/or other processes as described herein. In some examples, executing instructions may include running the instructions, converting the instructions, compiling the instructions, and/or interpreting the instructions, among other examples.

In some aspects, the UE includes means for receiving, from a wireless communication device, an aggregated signal including a plurality of frequency division multiplexed signals corresponding to a plurality of beams, each of the plurality of signals comprising a DFT-s-OFDM waveform associated with a unique pre-DFT-spreading sequence of a plurality of pre-DFT-spreading sequences; and/or means for decoding the plurality of signals based at least in part on the plurality of pre-DFT-spreading sequences. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the wireless communication device includes means for generating an aggregated signal including a plurality of frequency division multiplexed signals corresponding to a plurality of beams, each of the plurality of signals comprising a DFT-s-OFDM waveform associated with a unique pre-DFT-spreading sequence of a plurality of pre-DFT-spreading sequences; and/or means for transmitting the plurality of signals. In some aspects, the means for the wireless communication device to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246. In some aspects, the means for the wireless communication device to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
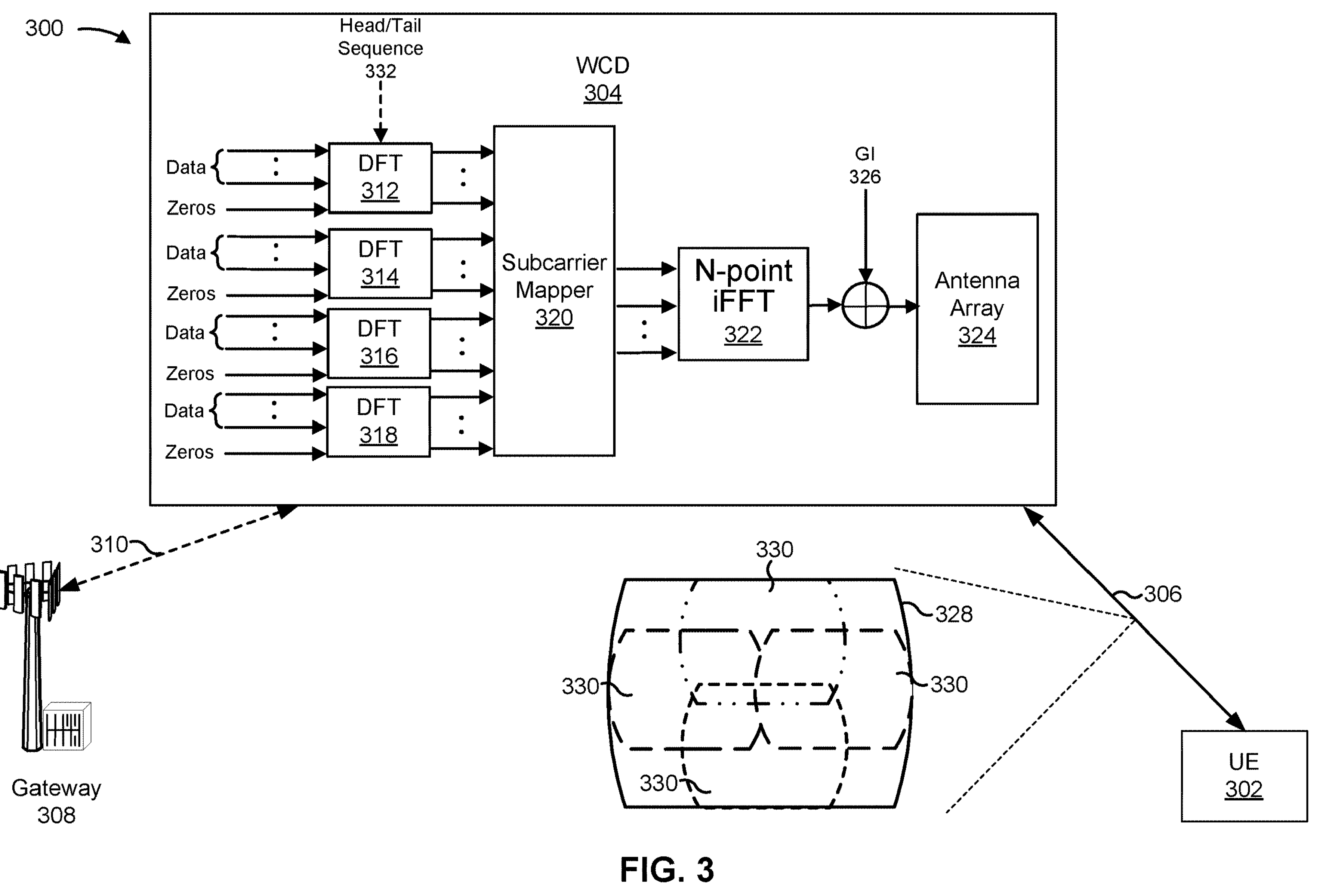
FIG. 3 is a diagram illustrating an example of a satellite deployment in a non-terrestrial network, in accordance with the present disclosure.

FIG. 3 is a diagram illustrating an example 300 of a wireless communication network, in accordance with the present disclosure. As shown, a UE 302 and a wireless communication device (WCD) 304 may communicate with one another. In some aspects, the WCD 304 may include a UE, a base station, and/or a relay device, among other examples. In some aspects, example 300 may show an example of a NTN implementation.

Example 300 may show an example of a regenerative satellite deployment and an example of a transparent satellite deployment. In the example of the regenerative satellite deployment, a UE 302 is served by the WCD 304, which may be a satellite, via a service link 306. For example, the WCD 304 may include a BS 110 (e.g., BS 110*a*), which may be, for example, a gNb. The UE 302 may be a UE 120. In some aspects, the WCD 304 may be referred to as a non-terrestrial base station, a regenerative repeater, or an on-board processing repeater. In some aspects, the satellite 304 may demodulate an uplink radio frequency signal and may modulate a baseband signal derived from the uplink radio signal to produce a downlink radio frequency transmission. The WCD 304 may transmit the downlink radio frequency signal on the service link 330. The WCD 304 may provide a cell that covers the UE 302.

In the example of a transparent satellite deployment, which may also be referred to as a bent-pipe satellite deployment, the UE 302 is served by the WCD 304, which may be a transparent satellite. The WCD 304 may relay a signal received from gateway 308 via a feeder link 310. For example, the WCD 304 may receive an uplink radio frequency transmission and may transmit a downlink radio frequency transmission without demodulating the uplink radio frequency transmission. In some aspects, the satellite 304 may frequency convert the uplink radio frequency transmission received on the service link 306 to a frequency of the uplink radio frequency transmission on the feeder link 310 and may amplify and/or filter the uplink radio frequency transmission. In some aspects, the UE 302 shown in example 300 may be associated with a Global Navigation Satellite System (GNSS) capability or a Global Positioning System (GPS) capability, though not all UEs have such capabilities. The WCD 304 may provide a cell that covers the UE 302 in a transparent satellite deployment as well.

The service link 306 may include a link between the WCD 304 and the UE 302, and may include one or more of an uplink or a downlink. The feeder link 310 may include a link between the WCD 304 and the gateway 308, and may include one or more of an uplink (e.g., from the UE 302 to the gateway 308) or a downlink (e.g., from the gateway 308 to the UE 302). The feeder link 310 and the service link 306 may each experience Doppler effects due to the movement of the WCD 304 and, potentially, movement of a UE 302. These Doppler effects may be significantly greater than in a terrestrial network. The Doppler effect on the feeder link 310 signal may be compensated to some degree, but may still be associated with some amount of uncompensated frequency error.

As shown, the WCD 304 may include a number of discrete Fourier transform ("DFT") components 312, 314, 316, and 318 that may receive data and generate a transformed intermediate data signal that is provided to a subcarrier mapper 320. As is also shown, in the case of zero-head and/or zero-tail DFT-s-OFDM waveforms, the DFT components 312, 314, 316, and 318 also may receive zeros for incorporation into the resulting transformed intermediate data signal (and, eventually, the output DFT-s-OFDM waveform). Zero-tail DFT-s-OFDM waveforms may be waveforms that include zeros added to a tail and/or a head of the data before the DFT processing. At the receiver, the zeros are extracted and discarded after iDFT processing. Zero-tail DFT-s-OFDM waveforms may facilitate flexible bandwidth assignment and may have variable zero tail length, which can be used to facilitate similar cyclical functionality as cyclic prefix (CP), without the decreased spectral efficiency that can be introduced by CPs. Zero-tail DFT-s-OFDM may be used with or without a guard interval (GI).

GIs may carry a sequence that can be used for time and/or frequency synchronization and/or channel estimation. Different GIs can be used by different UEs in uplink, accounting for different UE-specific delay spreads. In some cases, GI sequences may provide useful time domain autocorrelation for effective time and/or frequency tracking. Cross-correlation properties between different GIs may be used to reduce interference from GIs transmitted on the same resources in adjacent cells and/or for frequency division multiplexed (FDM) UEs in uplink in the same cell. To maintain desirable out-of-band emission properties, a GI sequence can be generated in the frequency domain and up-sampled using an inverse DFT (iDFT) of a size equal to the delay spread for which the system needs to account. To use GIs with zero-tail DFT-s-OFDM, before DFT, the original zeros in the zero-tail DFT-s-OFDM can be replaced with known sequences. Due to the linearity of the involved operations, the cascade of DFT, subcarrier mapping, and inverse fast Fourier transform (iFFT), each of the vectors contributing to the output signal features a significant energy only over a portion of the samples.

The subcarrier mapper 320 may map the intermediate data signals to respective subcarriers and output the mapped signals to an N-point iFFT component 322 that is configured to generate an FDM signal, which may be output to an antenna array 324. The antenna array 324 may transmit the FDM signal. The antenna array 324 may include one or more reflectarray antennas. A reflectarray antenna (sometimes referred to as a "reflectarray") includes an array of unit cells that are illuminated by a feeding antenna. The feeding antenna can be, for example, a horn. The unit cells can be backed by a ground plane and the incident wave from the feeding antenna reflects off of the unit cells in the direction of the beam. In some cases, a phase distribution of concentric rings can be applied to focus wavefronts from the feeding antenna into a plane wave. This can facilitate accounting for varying path lengths between the feeding antenna and the unit cells. A progressive phase shift can be applied to the unit cells to facilitate beam steering. In some cases, the feeding antenna can be offset from the beam path to prevent the feeding antenna from blocking the beam. Reflect arrays are increasingly desirable for satellite implementations in part because they focus the beam in a similar manner that a dish antenna (a parabolic reflector) focuses the beam, but with a much thinner form factor.

The antenna array 324 can include a single-feed-per-beam (SFPB) configuration. The antenna array 324 can include four reflectors to provide cellular coverage in a four color reuse scheme (two frequencies and two polarizations), at both the transmitter and receiver frequencies. Neighboring color spots (regions of different combinations of frequency and polarization) are produced by different SFPB reflectors, which eliminates the risk of feed overlap and results in reasonably low spillover for a reflector diameter of roughly 2.4 m. The reflectors may be implemented in any number of different configurations. However, carrying four reflectors can lead to a high consumption of the satellite's volume and weight resources.

Some architectures enable a reduction of the number of antennas required to produce multispot coverage, such as those based on multiple-feed-per-beam reflectors, direct radiating arrays, and active lenses. However, the high complexity and cost of the feeding systems and beamforming networks can offset some of the advantages of these solutions when compared to standard SFPB systems. Reflect arrays can be configured with the ability to produce separate beams in different polarizations and/or frequencies (different colors) through a single feed, making it possible to reuse the same aperture to generate all the spots associated with different colors.

The antenna array 324 may include a single reflector with a multi-feed beamforming network (BFN). The function of the beamforming network is to provide proper phase and amplitude excitations to the antenna elements (AEs) of the array 324. The BFN requirements can become more stringent for transmitting antennas fed by amplifiers at the input of the network. In this case, the desire to avoid power waste leads the network to be designed to be lossless, and, in turn, the excitations to be mutually orthonormal. The single reflector with multi-feed BFN can be more favorable for small form factor satellites since only one aperture is needed. However, this design may be less suitable for low-cost satellites due to increased costs and complexity.

In some cases, the antenna array 324 may include a phased array antenna (PAA). PAAs offer the greatest flexibility in beam steering and shaping, but have the disadvantages of being complex, expensive, heavy, and less power efficient than reflector antennas. In some cases, the antenna array 324 may include a phased array fed reflector (PAFR) antenna. PAFRs use a PAA feed to illuminate a reflector antenna. This architecture leverages the high gain of a reflector antenna to allow the use of a smaller (fewer elements) and less expensive feed array while maintaining much of the flexibility of the PAA. A disadvantage of this architecture can be that the beam steering range is limited (therefore less suitable for LEO satellites demanding large steering angles). Beamforming operations can also be performed (digitally) on the ground through the gateway 308, where beamforming resources are virtually unlimited. A limitation of this approach is the bandwidth and the accessibility of a high-throughput feeder link 310 (which might be difficult for satellites with fast ground speed).

It can be advantageous to use a low peak-to-average-power ratio (PAPR) waveform for satellite communications. Satellite is power limited, while power amplifier efficiency is low at higher bands and larger bandwidths, especially with CP-OFDM waveforms. Although single carrier (SC)-quadrature amplitude modulation (QAM) (or more recently introduced constant envelope (CE)-OFDM and/or phase modulation (PM)-OFDM)) provides good PAPR performance, it may not be flexible enough for multi-user resource allocation as in OFDM. DFT-s-OFDM offers a more promising tradeoff compromising resource allocation flexibility and PAPR. Zero-tail (ZT) DFT-s-OFDM provides more flexible and efficient resource utilization than CP-DFT-s-OFDM, considering various multipath scenarios in NTN. Additionally, DFT-s-OFDM with GI provides more efficient resource utilization than ZT-DFT-s-OFDM without GIs, as GI signals can be used for time domain and/or frequency domain synchronization.

FDM (or polarization-multiplexed) adjacent beams can be useful for implementation in NTN scenarios to avoid inter-beam interference. Digital beamforming can be used for multiple FDM beams. However, in digital beamforming, as shown by reference number 326, a time domain GI is often added after the iFFT processing. The GI may correspond to a wideband precoder associated with a wideband beam having a large beam footprint 328, which is a different precoder than the precoders used for different FDM data beams, which can have narrower beam footprints 330. As such, adding the GI after the iFFT processing can make channel estimation difficult for the UE 302 and, as a result, can have a negative impact on network performance.

Some aspects of the techniques and apparatuses disclosed herein may facilitate channel estimation using GIs with digitally beamformed GI-DFT-s-OFDM signals by using FDM beam-specific pre-DFT-spreading sequences. For example, as shown by reference number 332, a wireless communication device (e.g., the WCD 304) may add a unique pre-DFT-spreading sequence (shown as "head/tail sequence") before generating an aggregated signal including a plurality of FDM signals corresponding to a plurality of beams. Each of the plurality of signals may include a DFT-s-OFDM waveform associated with a unique pre-DFT-spreading sequence of a plurality of pre-DFT-spreading sequences. In this way, some aspects may facilitate GI-based channel estimation and, as a result, may have a positive impact on network performance.

As indicated above, FIG. 3 is provided as an example. Other examples may differ from what is described with regard to FIG. 3.

Figure 4:
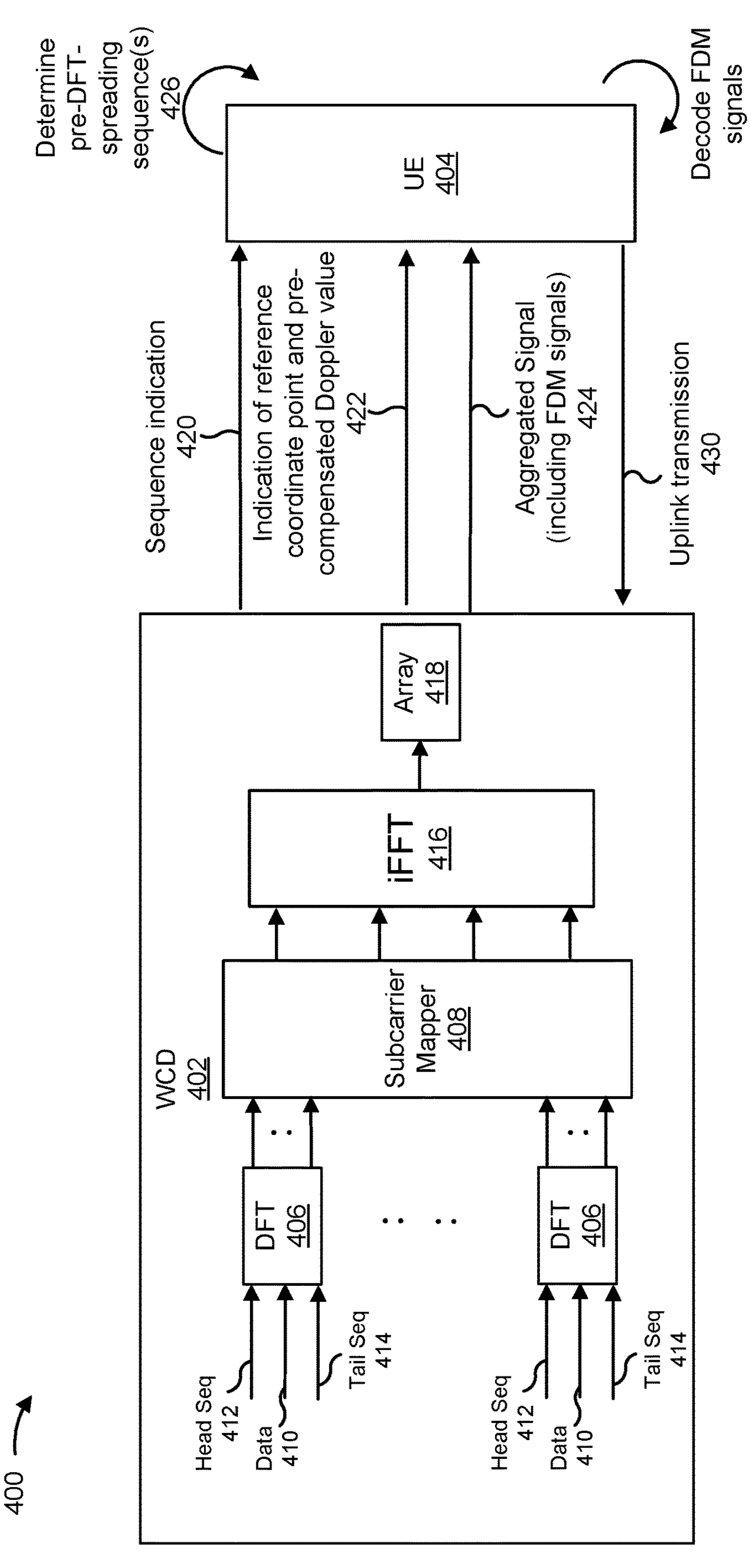
FIG. 4 is a diagram illustrating an example associated with digital beamforming based on unique pre-discrete-Fourier-transform (DFT)-spreading sequences, in accordance with the present disclosure.

FIG. 4 is a diagram illustrating an example 400 of digital beamforming based on unique pre-DFT-spreading sequences, in accordance with the present disclosure. As shown in FIG. 4, a wireless communication device (WCD)

402 and a UE 404 may communicate with one another. In some aspects, the WCD 402 may be a base station, a relay device, and/or an NTN device such as, for example, a satellite.

As shown, the WCD 402 may include a number of DFT components (shown as "DFT") 406, each of which may receive data 410 and generate a transformed intermediate data signal that is provided to a subcarrier mapper 408. As is also shown, each DFT component 406 also may receive a head sequence 412 and/or a tail sequence 414 for incorporation into the resulting transformed intermediate data signal (and, eventually, the output DFT-s-OFDM waveform). The subcarrier mapper 408 may map the intermediate data signals to respective subcarriers and output the mapped signals to an iFFT component 416. The iFFT component 416 may be configured to generate an aggregated signal, which may be output to an antenna array 418. The aggregated signal may include a plurality of FDM signals. In some aspects, one or more beamforming components may be disposed between the iFFT component 416 and the antenna array 418. For example, one or more power splitters and/or phase shifters may be disposed between the iFFT component 416 and the antenna array 418 to support analog beamforming operations.

As shown by reference number 420, the WCD 402 may transmit, and the UE 404 may receive, a sequence indication. The sequence indication may be carried in at least one of a radio resource control (RRC) message, a medium access control control element (MAC CE), or a downlink control information (DCI) transmission. The sequence indication may indicate information corresponding to one or more pre-DFT-spreading sequences. In some aspects, the sequence indication may indicate parameters of the pre-DFT-spreading sequences, formulas for determining the parameters, and/or the sequences themselves, among other examples.

As shown by reference number 422, the WCD 402 may transmit, and the UE 404 may receive, an indication of a reference coordinate point and a pre-compensated Doppler value. In some aspects, the UE 404 may use the reference coordinate point and the pre-compensated Doppler value to facilitate decoding signals received from the WCD 402. In some aspects, the UE 404 may determine a target beam of a plurality of beams based at least in part on a frequency synchronized from a time domain guard interval associated with the target beam. The UE 404 may determine that the reference coordinate point is located outside of a target footprint of the target beam. For example, the UE 404 may be provided with a single reference coordinate point together with a pre-compensated Doppler value, where the UE 404 expects a frequency synchronized from a time domain-represented GI associated with the target FDM beam to include a constant difference from 0 Hertz.

As shown by reference number 424, the WCD 402 may transmit, and the UE 404 may receive, an aggregated signal including a plurality of FDM signals corresponding to a plurality of beams. Each of the plurality of signals may include a DFT-s-OFDM waveform associated with a unique pre-DFT-spreading sequence of a plurality of pre-DFT-spreading sequences. As shown by reference number 426, the UE 404 may determine the plurality of pre-DFT-spreading sequences. For example, in some aspects, the UE 404 may determine the plurality of pre-DFT-spreading sequences based at least in part on the sequence indication. In some aspects, the UE 404 may determine a unique pre-DFT-spreading sequence based at least in part on a ratio between the unique pre-DFT-spreading sequence and a data sequence. In some aspects, the UE 404 may determine the unique pre-DFT-spreading sequence based at least in part on one or more sequence components of the unique pre-DFT-spreading sequence. For example, the UE 404 may determine the unique pre-DFT-spreading sequence by filtering out a target sequence associated with an adjacent beam in a time domain.

As shown by reference number 428, the UE 404 may decode the plurality of signals based at least in part on the plurality of pre-DFT-spreading sequences. In some aspects, the UE 404 may decode the plurality of signals based at least in part on the reference coordinate point and the pre-compensated Doppler value.

As shown by reference number 430, the UE 404 may transmit, and the WCD 402 may receive, an uplink transmission. For example, in some aspects, the UE 404 may perform frequency synchronization based at least in part on the time domain GI associated with the target beam and a geographic location of the UE. The UE 404 may determine a frequency pre-compensation value for an uplink transmission based at least in part on the reference coordinate point and the pre-compensated Doppler value and may transmit the uplink transmission based at least in part on the frequency pre-compensation value. In some aspects, the UE 404 may determine a GI sequence to be used for the frequency synchronization based at least in part on at least one of a received configuration, a received indication, GNSS information associated with the UE, or ephemeris information associated with the WCD 402.

As indicated above, FIG. 4 is provided as an example. Other examples may differ from what is described with respect to FIG. 4.

FIG. 5 is a diagram illustrating an example process 500 performed, for example, by a UE, in accordance with the present disclosure. Example process 500 is an example where the UE (e.g., UE 404) performs operations associated with digital beamforming based on unique pre-DFT-spreading sequences.

As shown in FIG. 5, in some aspects, process 500 may include receiving, from a wireless communication device, an aggregated signal including a plurality of FDM signals corresponding to a plurality of beams, each of the plurality of signals comprising a DFT-s-OFDM waveform associated with a unique pre-DFT-spreading sequence of a plurality of pre-DFT-spreading sequences (block 510). For example, the UE (e.g., using communication manager 708 and/or reception component 702, depicted in FIG. 7) may receive, from a wireless communication device, an aggregated signal including a plurality of FDM signals corresponding to a plurality of beams, each of the plurality of signals comprising a DFT-s-OFDM waveform associated with a unique pre-DFT-spreading sequence of a plurality of pre-DFT-spreading sequences, as described above.

As further shown in FIG. 5, in some aspects, process 500 may include decoding the plurality of signals based at least in part on the plurality of pre-DFT-spreading sequences (block 520). For example, the UE (e.g., using communication manager 708 and/or reception component 702, depicted in FIG. 7) may decode the plurality of signals based at least in part on the plurality of pre-DFT-spreading sequences, as described above.

Process 500 may include additional aspects, such as any single aspect or any combination of aspects described below and/or in connection with one or more other processes described elsewhere herein.

In a first aspect, process 500 includes receiving a sequence indication, and determining, based at least in part on the sequence indication, the plurality of pre-DFT-spreading sequences.

In a second aspect, alone or in combination with the first aspect, receiving the sequence indication comprises receiving at least one of an RRC message, a MAC CE, or a DCI transmission.

In a third aspect, alone or in combination with one or more of the first and second aspects, the unique pre-DFT-spreading sequence comprises a head sequence or a tail sequence.

In a fourth aspect, alone or in combination with one or more of the first through third aspects, process 500 includes determining the unique pre-DFT-spreading sequence based at least in part on a ratio between the unique pre-DFT-spreading sequence and a data sequence.

In a fifth aspect, alone or in combination with one or more of the first through fourth aspects, process 500 includes determining the unique pre-DFT-spreading sequence based at least in part on one or more sequence components of the unique pre-DFT-spreading sequence.

In a sixth aspect, alone or in combination with the fifth aspect, determining the unique pre-DFT-spreading sequence comprises filtering out a target sequence associated with an adjacent beam in a time domain.

In a seventh aspect, alone or in combination with one or more of the first through sixth aspects, process 500 includes receiving an indication of a reference coordinate point and a pre-compensated Doppler value, wherein decoding the plurality of signals comprises decoding the plurality of signals based at least in part on the reference coordinate point and the pre-compensated Doppler value.

In an eighth aspect, alone or in combination with the seventh aspect, process 500 includes determining a target beam of the plurality of beams based at least in part on a frequency synchronized from a time domain guard interval associated with the target beam.

In a ninth aspect, alone or in combination with the eighth aspect, process 500 includes determining that the reference coordinate point is located outside of a target footprint of the target beam.

In a tenth aspect, alone or in combination with one or more of the eighth through ninth aspects, process 500 includes performing frequency synchronization based at least in part on the time domain guard interval associated with the target beam and a geographic location of the UE, determining a frequency pre-compensation value for an uplink transmission based at least in part on the reference coordinate point and the pre-compensated Doppler value, and transmitting the uplink transmission based at least in part on the frequency pre-compensation value.

In an eleventh aspect, alone or in combination with the tenth aspect, process 500 includes determining a GI sequence to be used for the frequency synchronization based at least in part on at least one of a received configuration, a received indication, GNSS information associated with the UE, or information associated with the wireless communication device.

In a twelfth aspect, alone or in combination with one or more of the first through eleventh aspects, the wireless communication device is a non-terrestrial device.

In a thirteenth aspect, alone or in combination with the twelfth aspect, the non-terrestrial device is associated with a satellite.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
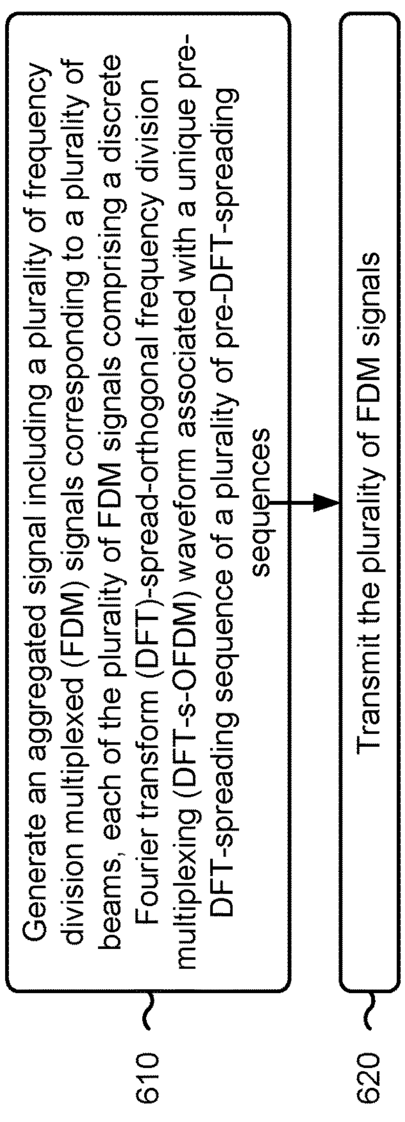

FIG. 6 is a diagram illustrating an example process 600 performed, for example, by a wireless communication device, in accordance with the present disclosure. Example process 600 is an example where the wireless communication device (e.g., WCD 402) performs operations associated with digital beamforming based on unique pre-DFT-spreading sequences.

As shown in FIG. 6, in some aspects, process 600 may include generating an aggregated signal including a plurality of FDM signals corresponding to a plurality of beams, each of the plurality of FDM signals comprising a DFT-s-OFDM waveform associated with a unique pre-DFT-spreading sequence of a plurality of pre-DFT-spreading sequences (block 610). For example, the wireless communication device (e.g., using communication manager 808 and/or generation component 810, depicted in FIG. 8) may generate an aggregated signal including a plurality of FDM signals corresponding to a plurality of beams, each of the plurality of FDM signals comprising a DFT-s-OFDM waveform associated with a unique pre-DFT-spreading sequence of a plurality of pre-DFT-spreading sequences, as described above.

As further shown in FIG. 6, in some aspects, process 600 may include transmitting the plurality of FDM signals (block 620). For example, the wireless communication device (e.g., using communication manager 808 and/or transmission component 804, depicted in FIG. 8) may transmit the plurality of signals, as described above.

Process 600 may include additional aspects, such as any single aspect or any combination of aspects described below and/or in connection with one or more other processes described elsewhere herein.

In a first aspect, process 600 includes transmitting a sequence indication that indicates the plurality of pre-DFT-spreading sequences.

In a second aspect, alone or in combination with the first aspect, transmitting the sequence indication comprises transmitting at least one of an RRC message, a MAC CE, or a DCI transmission.

In a third aspect, alone or in combination with one or more of the first and second aspects, the unique pre-DFT-spreading sequence comprises a head sequence or a tail sequence.

In a fourth aspect, alone or in combination with one or more of the first through third aspects, process 600 includes transmitting an indication of a reference coordinate point and a pre-compensated Doppler value.

In a fifth aspect, alone or in combination with the fourth aspect, a target beam of the plurality of beams is based at least in part on a frequency synchronized from a time domain GI associated with the target beam.

In a sixth aspect, alone or in combination with the fifth aspect, the reference coordinate point is located outside of a target footprint of the target beam.

In a seventh aspect, alone or in combination with one or more of the fifth through sixth aspects, process 600 includes receiving an uplink transmission based at least in part on a frequency pre-compensation value, wherein the frequency pre-compensation value is based at least in part on the reference coordinate point and the pre-compensated Doppler value.

In an eighth aspect, alone or in combination with one or more of the first through seventh aspects, the wireless communication device is a non-terrestrial device.

In a ninth aspect, alone or in combination with the eighth aspect, the non-terrestrial device is associated with a satellite.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
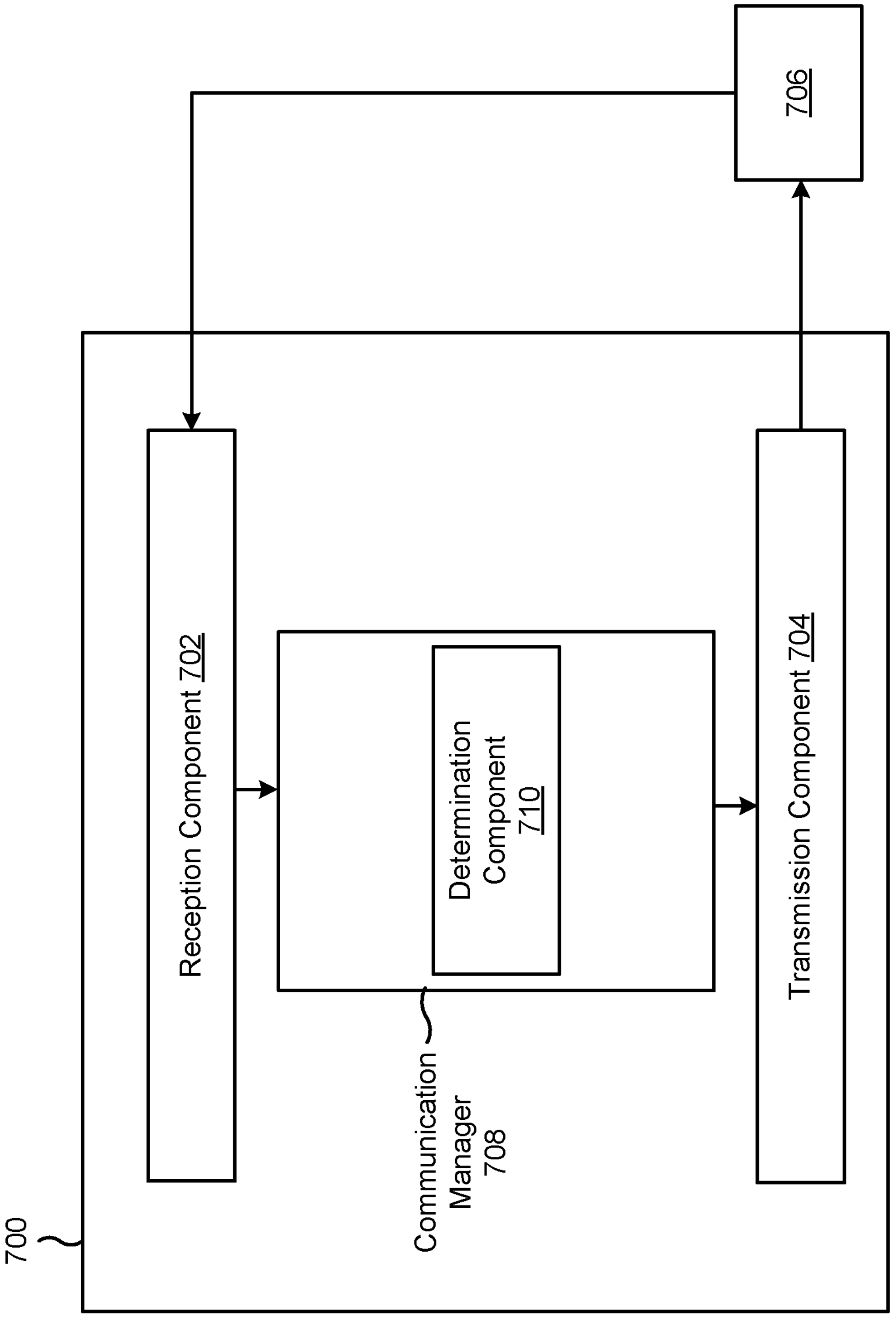
FIGS. 7 and 8 are diagrams of example apparatuses for wireless communication, in accordance with the present disclosure.

FIG. 7 is a diagram of an example apparatus 700 for wireless communication. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include a communication manager 708. The communication manager 708 may include a determination component 710.

In some aspects, the apparatus 700 may be configured to perform one or more operations described herein in connection with FIG. 4. Additionally, or alternatively, the apparatus 700 may be configured to perform one or more processes described herein, such as process 500 of FIG. 5. In some aspects, the apparatus 700 and/or one or more components shown in FIG. 7 may include one or more components of the UE described in connection with FIG. 2. Additionally, or alternatively, one or more components shown in FIG. 7 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a modem, a demodulator, a MIMO detector, a receive processor, a controller/processor, a memory, or a combination thereof, of the UE described in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706.

In some aspects, the transmission component 704 may include one or more antennas, a modem, a modulator, a transmit MIMO processor, a transmit processor, a controller/processor, a memory, or a combination thereof, of the UE described in connection with FIG. 2. In some aspects, the transmission component 704 may be co-located with the reception component 702 in a transceiver.

The reception component 702 may receive, from a wireless communication device, an aggregated signal including a plurality of FDM signals corresponding to a plurality of beams, each of the plurality of FDM signals comprising a DFT-s-OFDM waveform associated with a unique pre-DFT-spreading sequence of a plurality of pre-DFT-spreading sequences. The communication manager 708 and/or the reception component 702 may decode the plurality of signals based at least in part on the plurality of pre-DFT-spreading sequences. In some aspects, the communication manager 708 may include one or more antennas, a modem, a modulator, a transmit MIMO processor, a transmit processor, a controller/processor, a memory, or a combination thereof, of the UE described in connection with FIG. 2. In some aspects, the communication manager 708 may include the reception component 702 and/or the transmission component 704.

The reception component 702 may receive a sequence indication. The determination component 710 may determine, based at least in part on the sequence indication, the plurality of pre-DFT-spreading sequences. In some aspects, the determination component 710 may include one or more antennas, a modem, a modulator, a transmit MIMO processor, a transmit processor, a controller/processor, a memory, or a combination thereof, of the UE described in connection with FIG. 2. In some aspects, the determination component 710 may include the reception component 702 and/or the transmission component 704.

The determination component 710 may determine the unique pre-DFT-spreading sequence based at least in part on a ratio between the unique pre-DFT-spreading sequence and a data sequence. The determination component 710 may determine the unique pre-DFT-spreading sequence based at least in part on one or more sequence components of the unique pre-DFT-spreading sequence.

The reception component 702 may receive an indication of a reference coordinate point and a pre-compensated Doppler value, wherein decoding the plurality of signals comprises decoding the plurality of signals based at least in part on the reference coordinate point and the pre-compensated Doppler value.

The determination component 710 may determine a target beam of the plurality of beams based at least in part on a frequency synchronized from a time domain guard interval associated with the target beam. The determination component 710 may determine that the reference coordinate point is located outside of a target footprint of the target beam. The communication manager 708 may perform frequency synchronization based at least in part on the time domain guard interval associated with the target beam and a geographic location of the UE.

The determination component 710 may determine a frequency pre-compensation value for an uplink transmission based at least in part on the reference coordinate point and the pre-compensated Doppler value. The transmission component 704 may transmit the uplink transmission based at least in part on the frequency pre-compensation value.

The determination component 710 may determine a guard interval sequence to be used for the frequency synchronization based at least in part on at least one of a received configuration, a received indication, global navigation satellite system information associated with the UE, or ephemeris information associated with the wireless communication device.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

Figure 8:
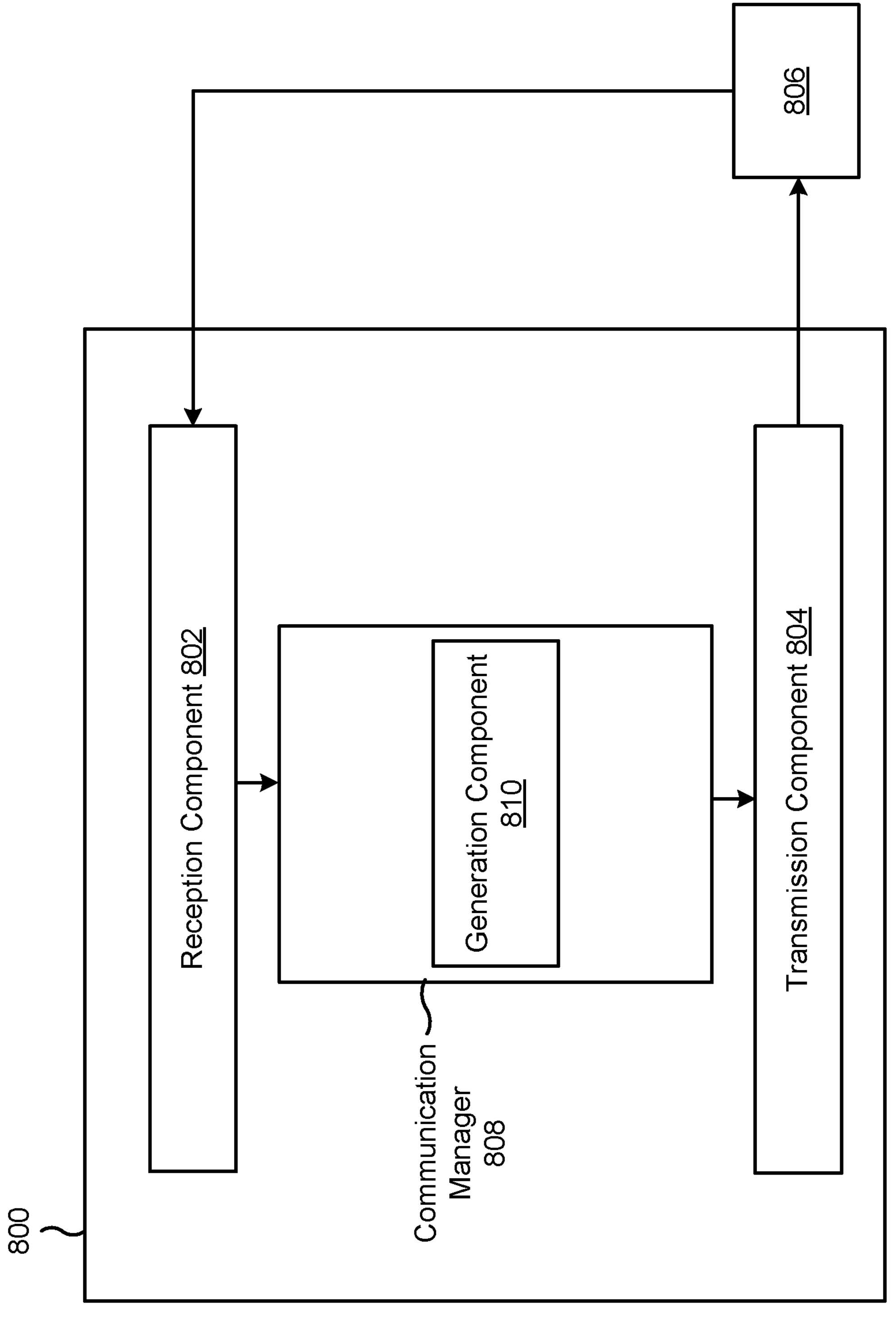

FIG. 8 is a diagram of an example apparatus 800 for wireless communication. The apparatus 800 may be a wireless communication device, or a wireless communication device may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include a communication manager 808. The communication manager 808 may include a generation component 810.

In some aspects, the apparatus 800 may be configured to perform one or more operations described herein in connection with FIG. 4. Additionally, or alternatively, the apparatus 800 may be configured to perform one or more processes described herein, such as process 600 of FIG. 6. In some aspects, the apparatus 800 and/or one or more components shown in FIG. 8 may include one or more components of the base station or the UE described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a modem, a demodulator, a MIMO detector, a receive processor, a controller/processor, a memory, or a combination thereof, of the base station or the UE described in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the base station or the UE described in connection with FIG. 2. In some aspects, the transmission component 804 may be co-located with the reception component 802 in a transceiver.

The communication manager 808 and/or the generation component 810 may generate an aggregated signal including a plurality of FDM signals corresponding to a plurality of beams, each of the plurality of FDM signals comprising a DFT-s-OFDM waveform associated with a unique pre-DFT-spreading sequence of a plurality of pre-DFT-spreading sequences. The transmission component 804 may transmit the plurality of signals. In some aspects, the communication manager 808 may include one or more antennas, a modem, a modulator, a transmit MIMO processor, a transmit processor, a controller/processor, a memory, or a combination thereof, of the base station or the UE described in connection with FIG. 2. In some aspects, the communication manager 808 may include the reception component 802 and/or the transmission component 804. In some aspects, the generation component 810 may include one or more antennas, a modem, a modulator, a transmit MIMO processor, a transmit processor, a controller/processor, a memory, or a combination thereof, of the base station or the UE described in connection with FIG. 2. In some aspects, the generation component 810 may include the reception component 802 and/or the transmission component 804.

The transmission component 804 may transmit a sequence indication that indicates the plurality of pre-DFT-spreading sequences. The transmission component 804 may transmit an indication of a reference coordinate point and a pre-compensated Doppler value. The reception component 802 may receive an uplink transmission based at least in part on a frequency pre-compensation value, wherein the frequency pre-compensation value is based at least in part on the reference coordinate point and the pre-compensated Doppler value.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a user equipment (UE), comprising: receiving, from a wireless communication device, an aggregated signal including a plurality of frequency division multiplexed (FDM) signals corresponding to a plurality of beams, each of the plurality of FDM signals comprising a discrete Fourier transform (DFT)-spread-orthogonal frequency division multiplexing (DFT-s-OFDM) waveform associated with a unique pre-DFT-spreading sequence of a plurality of pre-DFT-spreading sequences; and decoding the plurality of FDM signals based at least in part on the plurality of pre-DFT-spreading sequences.

Aspect 2: The method of Aspect 1, further comprising: receiving a sequence indication; and determining, based at least in part on the sequence indication, the plurality of pre-DFT-spreading sequences.

Aspect 3: The method of Aspect 2, wherein receiving the sequence indication comprises receiving at least one of: a radio resource control message, a medium access control control element, or a downlink control information transmission.

Aspect 4: The method of any of Aspects 1-3, wherein the unique pre-DFT-spreading sequence comprises a head sequence or a tail sequence.

Aspect 5: The method of any of Aspects 1-4, further comprising determining the unique pre-DFT-spreading sequence based at least in part on a ratio between the unique pre-DFT-spreading sequence and a data sequence.

Aspect 6: The method of any of Aspects 1-5, further comprising determining the unique pre-DFT-spreading sequence based at least in part on one or more sequence components of the unique pre-DFT-spreading sequence.

Aspect 7: The method of Aspect 6, wherein determining the unique pre-DFT-spreading sequence comprises filtering out a target sequence associated with an adjacent beam in a time domain.

Aspect 8: The method of any of Aspects 1-7, further comprising receiving an indication of a reference coordinate point and a pre-compensated Doppler value, wherein decoding the plurality of FDM signals comprises decoding the plurality of signals based at least in part on the reference coordinate point and the pre-compensated Doppler value.

Aspect 9: The method of Aspect 8, further comprising determining a target beam of the plurality of beams based at least in part on a frequency synchronized from a time domain guard interval associated with the target beam.

Aspect 10: The method of Aspect 9, further comprising determining that the reference coordinate point is located outside of a target footprint of the target beam.

Aspect 11: The method of either of Aspects 9 or 10, further comprising: performing frequency synchronization based at least in part on the time domain guard interval associated with the target beam and a geographic location of the UE; determining a frequency pre-compensation value for an uplink transmission based at least in part on the reference coordinate point and the pre-compensated Doppler value; and transmitting the uplink transmission based at least in part on the frequency pre-compensation value.

Aspect 12: The method of Aspect 11, further comprising determining a guard interval sequence to be used for the frequency synchronization based at least in part on at least one of: a received configuration, a received indication, global navigation satellite system information associated with the UE, or ephemeris information associated with the wireless communication device.

Aspect 13: The method of any of Aspects 1-12, wherein the wireless communication device is a non-terrestrial device.

Aspect 14: The method of Aspect 13, wherein the non-terrestrial device is associated with a satellite.

Aspect 15: A method of wireless communication performed by a wireless communication device, comprising: generating an aggregated signal including a plurality of frequency division multiplexed (FDM) signals corresponding to a plurality of beams, each of the plurality of FDM signals comprising a discrete Fourier transform (DFT)-spread-orthogonal frequency division multiplexing (DFT-s-OFDM) waveform associated with a unique pre-DFT-spreading sequence of a plurality of pre-DFT-spreading sequences; and transmitting the plurality of FDM signals.

Aspect 16: The method of Aspect 15, further comprising transmitting a sequence indication that indicates the plurality of pre-DFT-spreading sequences.

Aspect 17: The method of Aspect 16, wherein transmitting the sequence indication comprises transmitting at least one of: a radio resource control message, a medium access control control element, or a downlink control information transmission.

Aspect 18: The method of any of Aspects 15-17, wherein the unique pre-DFT-spreading sequence comprises a head sequence or a tail sequence.

Aspect 19: The method of any of Aspects 15-18, further comprising transmitting an indication of a reference coordinate point and a pre-compensated Doppler value.

Aspect 20: The method of Aspect 19, wherein a target beam of the plurality of beams is based at least in part on a frequency synchronized from a time domain guard interval associated with the target beam.

Aspect 21: The method of Aspect 20, wherein the reference coordinate point is located outside of a target footprint of the target beam.

Aspect 22: The method of either of Aspects 20 or 21, further comprising receiving an uplink transmission based at least in part on a frequency pre-compensation value, wherein the frequency pre-compensation value is based at least in part on the reference coordinate point and the pre-compensated Doppler value.

Aspect 23: The method of any of Aspects 15-22, wherein the wireless communication device is a non-terrestrial device.

Aspect 24: The method of Aspect 23, wherein the non-terrestrial device is associated with a satellite.

Aspect 25: An apparatus for wireless communication at a device, comprising a processor; memory coupled with the processor; and instructions stored in the memory and executable by the processor to cause the apparatus to perform the method of one or more of Aspects 1-14.

Aspect 26: A device for wireless communication, comprising a memory and one or more processors coupled to the memory, the one or more processors configured to perform the method of one or more of Aspects 1-14.

Aspect 27: An apparatus for wireless communication, comprising at least one means for performing the method of one or more of Aspects 1-14.

Aspect 28: A non-transitory computer-readable medium storing code for wireless communication, the code comprising instructions executable by a processor to perform the method of one or more of Aspects 1-14.

Aspect 29: A non-transitory computer-readable medium storing a set of instructions for wireless communication, the set of instructions comprising one or more instructions that, when executed by one or more processors of a device, cause the device to perform the method of one or more of Aspects 1-14.

Aspect 30: An apparatus for wireless communication at a device, comprising a processor; memory coupled with the processor; and instructions stored in the memory and executable by the processor to cause the apparatus to perform the method of one or more of Aspects 15-24.

Aspect 31: A device for wireless communication, comprising a memory and one or more processors coupled to the memory, the one or more processors configured to perform the method of one or more of Aspects 15-24.

Aspect 32: An apparatus for wireless communication, comprising at least one means for performing the method of one or more of Aspects 15-24.

Aspect 33: A non-transitory computer-readable medium storing code for wireless communication, the code comprising instructions executable by a processor to perform the method of one or more of Aspects 15-24.

Aspect 34: A non-transitory computer-readable medium storing a set of instructions for wireless communication, the set of instructions comprising one or more instructions that, when executed by one or more processors of a device, cause the device to perform the method of one or more of Aspects 15-24.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication, comprising:

at least one transceiver;

one or more memories comprising instructions; and one or more processors, coupled to the one or more memories, configured to execute the instructions to cause the apparatus to:

receive, via the at least one transceiver and from a wireless communication device, an aggregated signal including a plurality of frequency division multiplexed (FDM) signals corresponding to a plurality of beams, each of the plurality of FDM signals comprising a discrete Fourier transform (DFT)-spread-orthogonal frequency division multiplexing (DFT-s-OFDM) waveform that includes symbols provided to a DFT, the symbols including a unique pre-DFT-spreading sequence incorporated together with data, the unique pre-DFT-spreading sequence associated with a respective one of a plurality of pre-DFT-spreading sequences; and decode the plurality of FDM signals based at least in part on the plurality of pre-DFT-spreading sequences.

2. The apparatus of claim 1, wherein the one or more processors are further configured to cause the apparatus to receive, via the at least one transceiver, a sequence indication associated with the plurality of pre-DFT-spreading sequences, wherein the plurality of pre-DFT-spreading sequences are based on the sequence indication.

3. The apparatus of claim 2, wherein the sequence indication is received via at least one of:

a radio resource control message, a medium access control control element, or a downlink control information transmission.

4. The apparatus of claim 1, wherein the unique pre-DFT-spreading sequence comprises a head sequence or a tail sequence.

5. The apparatus of claim 1, wherein the unique pre-DFT-spreading sequence is based on a ratio between the unique pre-DFT-spreading sequence and a data sequence.

6. The apparatus of claim 1, wherein the unique pre-DFT-spreading sequence is based on one or more sequence components of the unique pre-DFT-spreading sequence.

7. The apparatus of claim 1, wherein the one or more processors are further configured to cause the apparatus to filter out a target sequence associated with an adjacent beam in a time domain, wherein the unique pre-DFT-spreading sequence is based on filtering out the target sequence.

8. The apparatus of claim 1, wherein the one or more processors are further configured to cause the apparatus to receive an indication of a reference coordinate point and a pre-compensated Doppler value associated with at least one of the plurality of beams, and wherein the one or more processors, to decode the plurality of FDM signals, are configured to cause the apparatus to decode the plurality of FDM signals based on the reference coordinate point and the pre-compensated Doppler value.

9. The apparatus of claim 8, wherein a target beam of the plurality of beams is based on a frequency synchronized from a time domain guard interval associated with the target beam.

10. The apparatus of claim 9, wherein the reference coordinate point is located outside of a target footprint of the target beam.

11. The apparatus of claim 9, wherein the one or more processors are further configured to cause the apparatus to:

perform frequency synchronization based on the time domain guard interval and a geographic location of the apparatus, wherein a frequency pre-compensation value, associated with an uplink transmission, is based on the reference coordinate point and the pre-compensated Doppler value; and transmit, via the at least one transceiver, the uplink transmission based on the frequency pre-compensation value.

12. The apparatus of claim 11, wherein a guard interval sequence, associated with the frequency synchronization, is based on at least one of:

a received configuration associated with the guard interval sequence, a received indication associated with the guard interval sequence, global navigation satellite system information associated with the apparatus, or ephemeris information associated with the wireless communication device.

13. The apparatus of claim 1, wherein the wireless communication device is a non-terrestrial device.

14. The apparatus of claim 13, wherein the non-terrestrial device is associated with a satellite.

15. An apparatus for wireless communication, comprising:

at least one transceiver;

one or more memories comprising instructions; and one or more processors, coupled to the one or more memories, configured to execute the instructions to cause the apparatus to:

generate an aggregated signal including a plurality of frequency division multiplexed (FDM) signals corresponding to a plurality of beams, each of the plurality of FDM signals comprising a discrete Fourier transform (DFT)-spread-orthogonal frequency division multiplexing (DFT-s-OFDM) waveform that includes symbols provided to a DFT, the symbols including a unique pre-DFT-spreading sequence incorporated together with data, the unique pre-DFT-spreading sequence associated with a respective one of a plurality of pre-DFT-spreading sequences; and transmit, via the at least one transceiver, the plurality of FDM signals.

16. The apparatus of claim 15, wherein the one or more processors are further configured to cause the apparatus to transmit, via the at least one transceiver, a sequence indication that indicates the plurality of pre-DFT-spreading sequences.

17. The apparatus of claim 16, wherein the sequence indication is transmitted via at least one of:

a radio resource control message, a medium access control control element, or a downlink control information transmission.

18. The apparatus of claim 15, wherein the unique pre-DFT-spreading sequence comprises a head sequence or a tail sequence.

19. The apparatus of claim 15, wherein the one or more processors are further configured to cause the apparatus to transmit, via the at least one transceiver, an indication of a reference coordinate point and a pre-compensated Doppler value associated with at least one of the plurality of beams.

20. The apparatus of claim 19, wherein a target beam of the plurality of beams is based on a frequency synchronized from a time domain guard interval associated with the target beam.

21. The apparatus of claim 20, wherein the reference coordinate point is located outside of a target footprint of the target beam.

22. The apparatus of claim 20, wherein the one or more processors are further configured to cause the apparatus to receive an uplink transmission based on a frequency pre-compensation value associated with the uplink transmission, wherein the frequency pre-compensation value is based on the reference coordinate point and the pre-compensated Doppler value.

23. The apparatus of claim 15, wherein the apparatus is a non-terrestrial device.

24. The apparatus of claim 23, wherein the non-terrestrial device is associated with a satellite.

25. A method of wireless communication performed by a user equipment (UE), comprising:

receiving, from a wireless communication device, an aggregated signal including a plurality of frequency division multiplexed (FDM) signals corresponding to a plurality of beams, each of the plurality of FDM signals comprising a discrete Fourier transform (DFT)-spread-orthogonal frequency division multiplexing (DFT-s-OFDM) waveform that includes symbols provided a DFT, the symbols including a unique pre-DFT-spreading sequence incorporated together with data, the unique pre-DFT-spreading sequence associated with a respective one of a plurality of pre-DFT-spreading sequences; and decoding the plurality of FDM signals based at least in part on the plurality of pre-DFT-spreading sequences.

* * * * *